US009721772B2

(12) United States Patent
Baus et al.

(10) Patent No.: US 9,721,772 B2
(45) Date of Patent: Aug. 1, 2017

(54) ION CHAMBER ENCLOSURE MATERIAL TO INCREASE GAMMA RADIATION SENSITIVITY

(71) Applicant: General Electric Company, Schenectady, NY (US)

(72) Inventors: Edward Joseph Baus, Akron, OH (US); Kevin Scott McKinny, Hudson, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 810 days.

(21) Appl. No.: 13/749,739

(22) Filed: Jan. 25, 2013

(65) Prior Publication Data

US 2014/0209810 A1 Jul. 31, 2014

(51) Int. Cl.
*G01T 1/185* (2006.01)
*H01J 47/02* (2006.01)
*H01J 47/00* (2006.01)

(52) U.S. Cl.
CPC ............ *H01J 47/02* (2013.01); *H01J 47/002* (2013.01)

(58) Field of Classification Search
CPC ................................ H01J 47/002; H01J 47/02
USPC .......................................................... 250/374
See application file for complete search history.

(56) References Cited

U.S. PATENT DOCUMENTS 2,220,509 A * 11/1940 Brons ...................... G01V 5/04 166/242.4
2,499,489 A * 3/1950 Goldstein ............... H01J 47/02 220/2.3 R
3,030,538 A * 4/1962 Warmoltz ............... H01J 47/04 313/570
4,300,050 A * 11/1981 Hizo et al. .................... 250/374
4,794,256 A * 12/1988 DiMartino ............ G01F 23/288 250/357.1
5,003,177 A * 3/1991 Hornstra ................. H01J 47/02 250/374
5,095,217 A 3/1992 Attix
5,508,526 A 4/1996 Labb
6,734,433 B1 5/2004 Meunier et al.
7,105,831 B1 9/2006 Kronenberg et al.
(Continued)

FOREIGN PATENT DOCUMENTS

CN 202487525 U 10/2012
FR 2912223 A1 8/2008
(Continued)

OTHER PUBLICATIONS

Machine Translation of Masahiko (JP2003130958).*
(Continued)

*Primary Examiner* — David Porta
*Assistant Examiner* — Gisselle Gutierrez
(74) *Attorney, Agent, or Firm* — Cooper Legal Group, LLC

(57) ABSTRACT

A radiation detection assembly that includes an ionization chamber having a cathode and an anode. The ionization chamber detects radiation that passes into the ionization chamber. The assembly includes an exterior enclosure defining a hollow internal volume within which the ionization chamber is enclosed. The exterior enclosure includes at least two layers. At least one of the layers provides an electromagnetic shield to the hollow internal volume and the ionization chamber enclosed therein.

20 Claims, 3 Drawing Sheets

(56) References Cited

U.S. PATENT DOCUMENTS

| | | | | |
|---|---|---|---|---|
| 2006/0138340 | A1 * | 6/2006 | Ianakiev | G01T 3/008 250/390.01 |
| 2006/0266951 | A1 | 11/2006 | Fritsch et al. | |
| 2008/0159476 | A1 * | 7/2008 | Koltick et al. | 378/53 |

FOREIGN PATENT DOCUMENTS

| | | | |
|---|---|---|---|
| JP | 2003130958 | A | 5/2003 |
| RU | 2297073 | C1 | 4/2007 |

OTHER PUBLICATIONS

International Search Report and Written Opinion issued in connection with corresponding WO Patent Application No. PCT/US2014/011205 dated Dec. 15, 2014.

Unofficial English Translation of Chinese Office Action issued in connection with corresponding CN Application No. 201480006054.7 on Apr. 25, 2016.

* cited by examiner

ION CHAMBER ENCLOSURE MATERIAL TO INCREASE GAMMA RADIATION SENSITIVITY

BACKGROUND OF THE INVENTION

Field of the Invention

The present invention relates generally to radiation detection assemblies and, in particular, to a radiation detection assembly with improved gamma radiation sensitivity.

Discussion of the Prior Art

Environmental radiation monitors are known and used to detect an amount of radiation at a locality. Radiation monitors can be deployed in the field proximate to a radiation source, such as a nuclear power generation station, to monitor radiation levels.

In one type of radiation monitor, an ionization chamber is utilized. The ionization chamber is housed within an exterior enclosure. In the past, the exterior enclosure was filled with a foam material to support the ionization chamber. The foam material was relatively dense and reduced sensitivity of the ionization chamber by blocking gamma radiation. In particular, the foam material had a density of approximately 0.304 grams/centimeters$^3$ with a thickness of approximately 2.032 centimeters (cm). Additionally, the exterior enclosure of the ionization chamber was formed from a relatively dense aluminum material. The aluminum material had a density of approximately 2.7 grams/cm$^3$ and a thickness of approximately 0.229 cm. Together, the aluminum and foam were approximately 1.232 grams/cm$^2$. These relatively dense materials tended to block gamma radiation and reduce sensitivity of the ionization chamber. Further, inadvertent contact between the ionization chamber, which is maintained at a voltage, and the aluminum enclosure could cause the aluminum enclosure to become electrically charged.

Accordingly, there is a need and it would be beneficial to improve sensitivity of the ionization chamber while isolating the ionization chamber from a surrounding enclosure.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a radiation detection assembly that includes an ionization chamber having a cathode and an anode. The ionization chamber detects radiation that passes into the ionization chamber. The assembly includes an exterior enclosure defining a hollow internal volume within which the ionization chamber is enclosed. The exterior enclosure includes at least two layers. At least one of the layers provides an electromagnetic shield to the hollow internal volume and the ionization chamber enclosed therein.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
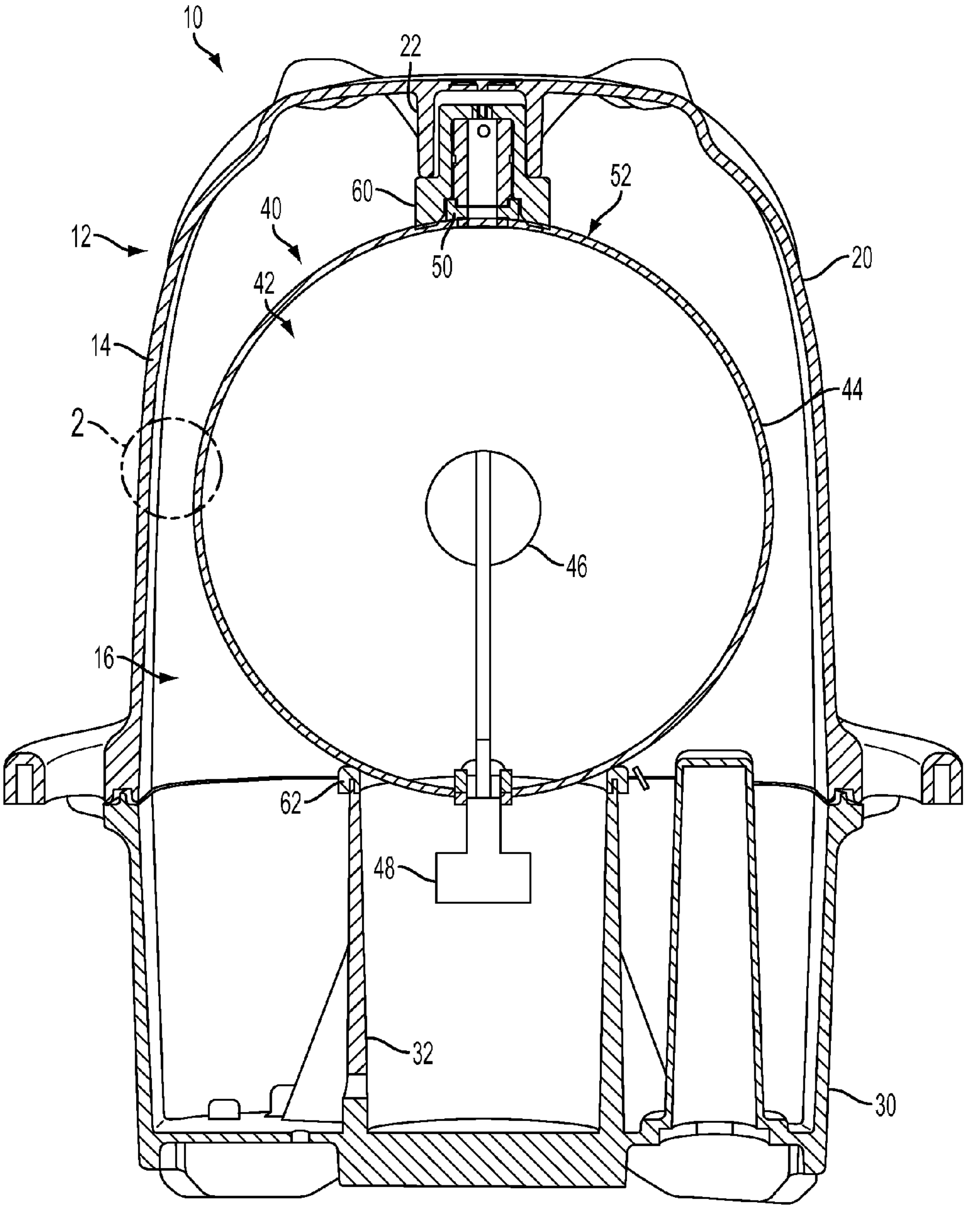
FIG. 1 is a partially torn open view of an example radiation detection assembly including an example ionization chamber that is supported a distance apart from an exterior enclosure in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of a partially torn open radiation detection assembly 10 in accordance with one aspect of the invention. It is to be appreciated that FIG. 1 merely shows one example of possible structures/configurations and that other examples are contemplated within the scope of the present invention. In general, the radiation detection assembly 10 is placed at an exterior location to perform the function of monitoring low-level gamma radiation in the local area atmosphere. The gamma radiation may be from known or unknown sources.

The radiation detection assembly 10 includes an exterior enclosure 12. The exterior enclosure 12 includes an exterior wall 14 that bounds a substantially hollow interior volume 16. In this example, the exterior enclosure 12 has a generally ellipsoid/ovoid shape, though other shapes are envisioned. For instance, in other examples, the exterior enclosure 12 includes a cuboid shape or other multi-sided three dimensional shapes of varying sizes. It is to be appreciated that the exterior enclosure 12 is depicted as being partially torn open in FIG. 1 for illustrative purposes and to more clearly show the interior volume 16. In operation, however, the exterior enclosure 12 is fully enclosed such that the interior volume 16 is not normally visible.

The exterior wall 14 includes a rigid, generally inflexible material that provides protection to the interior volume 16 from environmental effects (e.g., moisture, debris, etc.). The exterior wall 14 of the exterior enclosure 12 includes any number of different materials, including polymeric materials (e.g., plastics, etc.), combinations of materials that include polymeric materials, or the like. In one example, the exterior wall 14 of the exterior enclosure 12 is non-electrically conductive and/or includes a non-conductive material. Possible non-conductive materials include polycarbonate materials (e.g., Lexan®), plastics, polyvinyl chloride materials, polytetrafluoroethylene materials, low mass non-organic materials, or the like. In other examples, the exterior wall 14 may be coated and/or covered in an insulator/non-conductive material such that the exterior wall 14 is functionally non-conductive. By being non-conductive, the exterior wall 14 may come into contact with an electrical conductor while not becoming electrically charged. As such, the exterior wall 14 of the exterior enclosure 12 will electrically isolate the interior volume 16 from an exterior of the radiation detection assembly 10.

The exterior wall 14, including the polycarbonate material, plastic material, etc., has a relatively low density. This relatively low density can improve gamma sensitivity of the radiation detection assembly 10. In particular, the exterior wall 14 will shield less gamma radiation as compared to an exterior wall of a higher density material, such as metal (e.g., steel, aluminum, etc.). In one example, the exterior wall 14 includes the polycarbonate material having a density of approximately 1.19 grams/cm$^3$. While the exterior wall 14 can include a wide range of thicknesses, in this particular example, the thickness may be approximately 0.478 centimeters. As such, the exterior wall 14 has an areal density of approximately 0.57 grams/cm$^2$. Of course, it is to be appreciated that the exterior wall 14 is not limited to these amounts, as the density and thickness could be varied depending on the material used, required thickness, etc.

It is to be understood that the radiation detection assembly 10 is not limited to the aforementioned dimensions and calculations. Indeed, in one example, it is beneficial for the radiation detection assembly 10 to not scatter or absorb the gamma ray's initial energy prior to entering a detector portion (e.g., ionization chamber 40) of the radiation detection assembly 10. The probability of a gamma ray passing through a thickness, x, of a material without losing its initial energy is governed by $I(x)=I_0e^{-\mu_m\rho_\alpha}$. In this equation, $\mu_m$ is the mass attenuation coefficient and $\rho_a$ is the areal density (or mass thickness) in units of grams/cm$^2$. Over a range of gamma-ray energies extending from approximately 100 keV to several MeV, Compton scattering is a dominant gamma ray interaction process for materials with atomic numbers (Z) up to approximately, for example, 50. Within this energy range and for these atomic numbers, the mass attenuation coefficient ($\mu_m$) is approximately the same for all materials.

Accordingly, it is to be appreciated that for some range of gamma ray energies and materials with atomic numbers within a certain range, the gamma ray interaction probability is related, at least in part, to the areal density of the material. In one possible example, for gamma ray energies within a certain range (e.g., approximately ~100 keV to several MeV, though not limited to this range) and materials considered (Z=1-29, although higher Z values are contemplated), it is beneficial to minimize the areal density of the radiation detection assembly 10 to improve gamma sensitivity.

Referring still to the exterior enclosure 12, the exterior enclosure 12 includes a first enclosure portion 20. The first enclosure portion 20 forms one portion of the exterior enclosure 12. The first enclosure portion 20 forms an upper or top portion of the exterior enclosure 12 in the shown example. The first enclosure portion 20 is closed at one end (e.g., top end) and is generally open at an opposing second end (e.g., bottom end). In one possible example, the first enclosure portion 20 forms more than half of the length of the exterior enclosure 12. However, in other examples, the first enclosure portion 20 could be longer or shorter in length than as shown. The first enclosure portion 20 is formed from a portion of the exterior wall 14, such that the first enclosure portion 20 electrically isolates the interior volume 16 from an exterior.

The first enclosure portion 20 includes a first retaining structure 22 disposed within the first enclosure portion 20. The first retaining structure 22 extends from the exterior wall 14 into the interior volume 16. The first retaining structure 22 can extend a longer or shorter distance into the interior volume 16 than as shown. The first retaining structure 22 can be generally hollow, defining a cavity. It is to be appreciated that the first retaining structure 22 includes only one of many possible examples of retaining structures formed with respect to the first enclosure portion 20. Indeed, in other examples, the first retaining structure 22 may include nuts, bolts, screws, other mechanical fasteners, or the like.

The exterior enclosure 12 includes a second enclosure portion 30. The second enclosure portion 30 forms one portion of the exterior enclosure 12. The second enclosure portion 30 forms a lower or bottom portion of the exterior enclosure 12 in the shown example. The second enclosure portion 30 is closed at one end (e.g., bottom end) and is generally open at an opposing second end (e.g., top end). In one possible example, the first enclosure portion 20 forms more than half of the length of the exterior enclosure 12. However, in other examples, the first enclosure portion 20 could be longer or shorter in length than as shown. The second enclosure portion 30 is formed from a portion of the exterior wall 14, such that the second enclosure portion 30 electrically isolates the interior volume 16 from an exterior.

The second enclosure portion 30 includes a second retaining structure 32 disposed within the second enclosure portion 30. The second retaining structure 32 extends from the exterior wall 14 into the interior volume 16. The second retaining structure 32 is, in the shown example, integrally formed/molded with the exterior wall 14. Of course, in other examples, the second retaining structure 32 is not so limited, and instead could be separately attached with respect to the exterior wall 14. The second retaining structure 32 can extend a longer or shorter distance into the interior volume 16 than as shown. It is to be appreciated that the second retaining structure 32 includes only one of many possible examples of retaining structures formed with respect to the second enclosure portion 30. Indeed, in other examples, the second retaining structure 32 may include nuts, bolts, screws, other mechanical fasteners, or the like.

The radiation detection assembly 10 further includes an ionization chamber 40 for detecting radiation. The ionization chamber 40 is contained/housed within the interior volume 16 of the exterior enclosure 12. The ionization chamber 40 bounds a volume 42 that provides space for individual components of the ionization chamber 40. It is to be appreciated that the ionization chamber 40 in FIG. 1 is shown in section so as to more clearly show the volume 42. In operation, however, the ionization chamber 40 will be fully enclosed such that the volume 42 is not visible. It is to be understood that the ionization chamber 40 includes a number of possible arrangements. In one example, the ionization chamber 40 may include a high pressure ionization chamber (HPIC). The ionization chamber 40 has a generally spherical shape, though other shapes are envisioned.

The ionization chamber 40 includes a pair of electrodes, including a cathode 44 and an anode 46. The cathode 44 bounds the volume 42. In one example, the cathode 44 is sealed and filled with a pressurized gas, such as nitrogen gas, argon, mixtures of other gases, etc. As such, this pressurized gas within the volume 42 is relatively limited from inadvertently leaking out of the ionization chamber 40. The cathode 44 can be constructed of various materials such as metals, including stainless steel, aluminum, etc.

The ionization chamber 40 further includes the anode 46 extending into the volume 42 of the cathode 44. The anode 46 can include a support member, wire, or the like. As such, the anode 46 is not limited to the size or shape of the shown example. In this example, the anode 46 has a smaller cross-sectional size than the cathode 44 such that the anode 46 is radially spaced inward and apart from the cathode 44.

In general, the cathode 44 and anode 46 are each maintained at a voltage. Ions and electrons resulting from gamma interactions are formed in the volume 42. These ions and electrons are drawn toward the cathode 44 and anode 46, whereupon they are collected to generate a current. An amplifier 48 (and/or other associated electronics including electrometers, wires, etc.) is electrically connected to the cathode 44 and anode 46. The amplifier 48 will receive and analyze the current to determine several measurable quantities pertaining to radiation, such as gamma dose rate, etc. The amplifier 48 can be housed within an amplifier housing or the like.

The ionization chamber 40 further includes a relief assembly 50. The relief assembly 50 is attached to a surface 52 of the ionization chamber 40. The relief assembly 50 will allow for the pressurized gas within the cathode 44 to safely vent to an exterior of the ionization chamber 40. The relief assembly 50 can extend from the surface 52 of the ionization chamber 40 into the interior volume 16.

The radiation detection assembly 10 further includes one or more support structures for supporting the ionization chamber 40 with respect to the exterior enclosure 12. In one possible example, the support structures include a first support structure 60 and a second support structure 62.

The first support structure 60 engages the first retaining structure 22 on one side and the relief assembly 50 on an opposing side. The first support structure 60 can therefore support the ionization chamber 40 a distance apart from the first enclosure portion 20. The second support structure 62 can engage the second retaining structure 32 on one side and the surface 52 of the ionization chamber 40 on an opposing side. The second support structure 62 can therefore support the ionization chamber 40 a distance apart from the second enclosure portion 30. The first support structure 60 and second support structure 62 can therefore support diametrically opposed sides of the ionization chamber 40, with the surface 52 of the ionization chamber 40 being generally non-contacted therebetween.

The first support structure 60 and second support structure 62 can be formed of any number of materials. In one possible example, the first support structure 60 and second support structure 62 are formed from non-electrically conductive materials. These non-conductive materials include, for example, elastomeric materials (rubber), or the like. By including the non-conductive material(s), the first support structure 60 and second support structure 62 will electrically isolate the ionization chamber 40 from the exterior wall 14 of the exterior enclosure 12.

Figure 2:
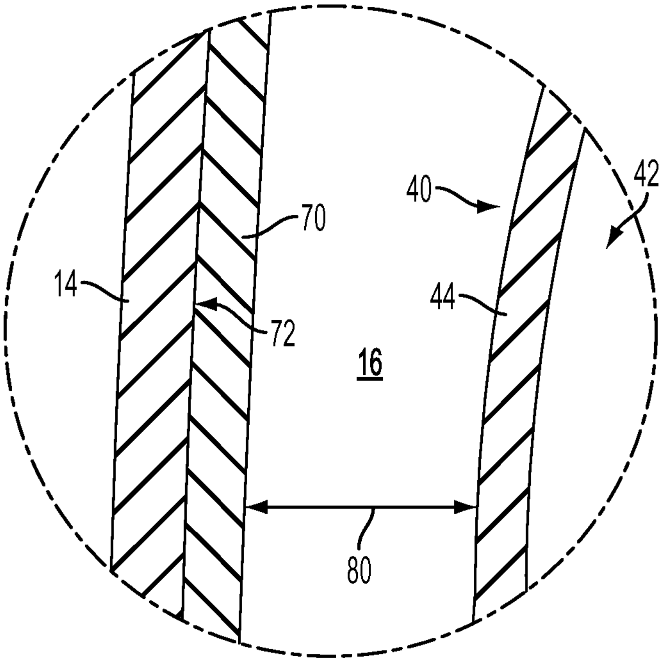
FIG. 2 is an enlarged view of a detail taken at circular section 2 of FIG. 1 of the example exterior enclosure of the radiation detection assembly.

Turning now to FIG. 2, an enlarged view of a detail taken at circular section 2 of FIG. 1 is shown. In the shown example, the exterior enclosure 12 includes a shielding layer 70. It is to be appreciated that the shielding layer 70 is only visible in FIG. 2, and not FIG. 1, due to the relatively small thickness of the shielding layer 70. Of course, the shielding layer 70 is not limited to the thickness shown in FIG. 2. Rather, the shielding layer 70 is somewhat generically/schematically depicted in FIG. 2 for illustrative purposes and to more clearly show the position of the shielding layer 70 with respect to the exterior wall 14 and ionization chamber 40. In further examples, the shielding layer 70 could be thicker or thinner than as shown.

The shielding layer 70 can be disposed on an inner surface 72 of the exterior wall 14. As such, the wall 14 is one layer of the exterior enclosure 12 and the shielding layer 70 is another layer of the exterior enclosure. Also, the wall 14 is on the exterior of the exterior enclosure 12, with the shielding layer 70 being on the interior of the exterior enclosure. Thus, in accordance with one aspect of the present invention, the exterior enclosure 12 has a multi-layer construction. As will be appreciated upon full understanding of this description, the different layers can have different functions and/or provide different benefits. It is to be appreciated that the multilayer-layer construction may include more than two layers without departing from the present invention.

In one example, the shielding layer 70 covers substantially the entire inner surface 72 of the exterior wall 14. In such an example, the shielding layer 70 covers the exterior wall 14 of both the first enclosure portion 20 and the second enclosure portion 30. It is to be appreciated, however, that the shielding layer 70 need not cover the entire exterior wall 14. In other examples, the shielding layer 70 may only cover portions of the exterior wall 14, such as portions of the exterior wall 14 in proximity to the ionization chamber 40.

The shielding layer 70 includes a wide range of thicknesses. In one possible example, the shielding layer 70 has a thickness of approximately 0.0127 centimeters. As such, the shielding layer 70 in this example is thinner than the exterior wall 14 (thickness of approximately 0.478 centimeters). It is to be appreciated that FIG. 2 depicts the shielding layer 70 having a thickness similar to that of the exterior wall 14 for illustrative purposes (i.e., to more clearly see the shielding layer 70). In operation, however, the shielding layer 70 may be thicker or thinner than as shown.

The shielding layer 70 includes any number of different materials. In one example, the shielding layer 70 is capable of electromagnetically shielding the interior volume 16, including the ionization chamber 40. In such an example, the shielding layer 70 will reduce and/or block the effects of an electromagnetic field from outside of the exterior enclosure 12 from acting upon the interior volume 16, including the ionization chamber 40. Accordingly, the shielding layer 70 of the exterior enclosure 12 will function to electromagnetically shield the ionization chamber 40 from outside of the exterior enclosure 12. The shielding layer 70 includes any number of materials that have at least some degree of electromagnetic shielding capabilities. In one possible example, the shielding layer 70 includes a nickel material, though other materials are envisioned.

In addition to providing electromagnetic shielding, the shielding layer 70 will also electrically isolate the ionization chamber 40 from the exterior enclosure 12. In particular, the shielding layer 70 can coat/cover some or all of the exterior wall 14. The shielding layer 70 can be applied in any number of ways to the inner surface 72, such as by painting, spraying, coating, depositing, etc. As such, if the ionization chamber 40 were to come into close proximity to the exterior enclosure 12, the cathode 44 would contact the shielding layer 70, and not the exterior wall 14. With the cathode 44 being maintained at a voltage, the shielding layer 70 will therefore limit/prevent contact between the cathode 44 and the exterior wall 14 of the exterior enclosure 12.

The shielding layer 70, in addition to the exterior wall 14, has a relatively low areal density. This relatively low areal density improves gamma sensitivity of the radiation detection assembly 10. In particular, the shielding layer 70 will block a relatively low amount of gamma radiation due to both the material and thickness of the shielding layer 70. In one example, the shielding layer 70 includes a nickel material having a density of approximately 7.81 grams/cm$^3$. While the shielding layer 70 includes a wide range of thicknesses, in this particular example, the thickness may be approximately 0.127 centimeters. As such, the thickness can be considered to be less than about 0.2 centimeters. As such, the areal density of the shielding layer 70 is low, being approximately 0.099 grams/$cm^2$. Of course, it is to be appreciated that the shielding layer 70 is not limited to these amounts, as the density and thickness could be varied.

In addition to the exterior wall 14 and shielding layer 70 having relatively low densities, the air within the substantially hollow interior volume 16 between the ionization chamber 40 and the exterior wall 14 also has a relatively low density. As shown in FIG. 2, an air space or layer 80 represents the closest distance between the ionization chamber 40 and the shielding layer 70 (i.e., as shown in FIG. 2). It is to be appreciated that there is no resilient foam material present to surround the ionization chamber 40 within the shown example and thus the air layer 80 is present. The open air space comprises the bulk between the ionization chamber 40 and the shielding layer 70 of the exterior enclosure 12.

In the shown example, the air layer 80 has a dimension of approximately 1.905 cm, which represents the distance from the ionization chamber 40 to the shielding layer 70 at one particular location (e.g., a closest distance). Of course, it is to be appreciated that varying distances between the ionization chamber 40 and the shielding layer 70 or exterior wall 14 are envisioned, such that this distance is not intended to be limiting. Air has a density of approximately 0.0013 grams/$cm^3$. As such, the air layer 80 located between the ionization chamber 40 and the shielding layer 70 is approximately 0.00248 grams/$cm^2$.

It is to be appreciated that the radiation detection assembly 10 of the present example has a relatively low density so as to reduce gamma blockage at the ionization chamber 40. In particular, the combination of the exterior wall 14 (0.57 grams/$cm^2$), the shielding layer 70 (0.099 grams/$cm^2$) and air layer 80 (0.00248 grams/$cm^2$) yields a grams per square centimeter of 0.67 grams/$cm^2$. Such can be considered to be less than 0.7 grams/$cm^2$. In comparison, as set forth above, examples of radiation detection assemblies including an aluminum enclosure packed with foam material yielded a grams per square centimeter of approximately 1.232 grams/$cm^2$. The radiation detection assembly 10 of the present example therefore exhibits at least a 46% reduction in material that shields the ionization chamber 40. Moreover, since the interior volume 16 that houses the ionization chamber 40 is generally hollow (i.e., foam is not used), moisture, condensation, and/or other liquids are less likely to be absorbed/retained therein as compared to the enclosure having the foam material.

Figure 3:
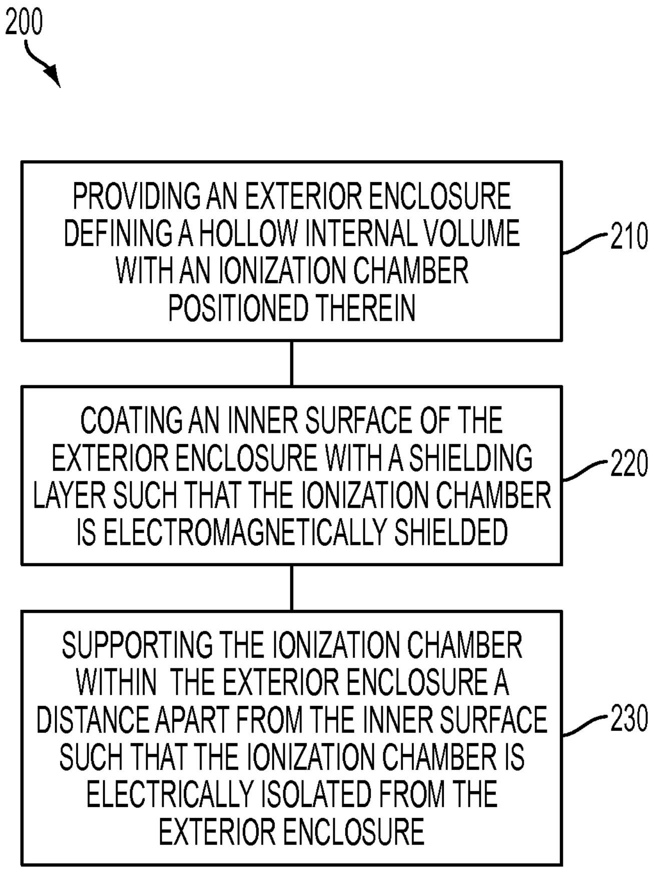
FIG. 3 is a flowchart depicting a method of detecting radiation with the radiation detection assembly of FIG. 1.

Turning now to FIG. 3, an example method 200 of detecting radiation with the radiation detection assembly 10 is shown. The method 200 can be performed in association with the radiation detection assembly 10, including the exterior enclosure 12, ionization chamber 40, shielding layer 70, etc. shown in FIGS. 1 and 2.

The method 200 includes a step 210 of providing the exterior enclosure 12 having the internal volume 16. As shown in FIG. 1, the internal volume 16 is substantially hollow with the ionization chamber 40 positioned therein. In contrast with prior examples, the internal volume 16 is generally filled with air, and thus has a relatively low density so as to block as little gamma radiation from the ionization chamber 40 as possible.

The method 200 includes a step 220 of coating the inner surface 72 of the exterior wall 14 of the exterior enclosure 12 with the shielding layer 70. As described with respect to FIG. 2, the shielding layer 70 can be coated on the inner surface 72 in any number of ways, such as by painting, spraying, depositing, etc. Further, the shielding layer 70 need not cover the entire inner surface 72, and instead may cover only some of the inner surface 72. In one particular example, the shielding layer 70 includes a nickel material, though other materials that provide an electromagnetic shielding characteristic are envisioned. Accordingly, the shielding layer 70 will electromagnetically shield the interior volume 16, including the ionization chamber 40, from an exterior of the exterior enclosure 12.

The method 200 further includes a step 230 of supporting the ionization chamber 40 within the exterior enclosure 12 a distance apart from the inner surface 72. In particular, the radiation detection assembly 10 includes the first support structure 60 for supporting one side of the ionization chamber 40 and the second support structure 62 for supporting an opposing side of the ionization chamber 40. Each of the first support structure 60 and second support structure 62 will support the ionization chamber 40 a distance apart from the inner surface 72 of the exterior wall 14 such that the ionization chamber 40 is normally not in contact with the exterior wall 14. Accordingly, this spacing causes the ionization chamber 40 to be electrically isolated from the exterior enclosure 12.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A gamma radiation detection assembly including:

an ionization chamber having a cathode and an anode, and the ionization chamber being configured to detect gamma radiation that passes into the ionization chamber; and an exterior enclosure defining a hollow internal volume within which the ionization chamber is enclosed, the exterior enclosure including at least two layers, at least one of the layers being configured as an electromagnetic shield that shields the hollow internal volume and the ionization chamber enclosed therein from electromagnetic field and being configured with a areal density that minimizes gamma radiation blocking, with the ionization chamber being spaced inward, away from the exterior enclosure with an open air space located between the ionization chamber and the exterior enclosure.

2. The radiation detection assembly of claim 1, wherein the exterior enclosure includes a wall and the at least one of the layers that is configured as an electromagnetic shield is a shielding layer and the shielding layer is on an inner surface of the wall of the exterior enclosure, and with both the wall and the shielding layer being away from the ionization chamber by the open air space.

3. The radiation detection assembly of claim 2, wherein the ionization chamber is spherical shape and the exterior enclosure is configured to receive the spherical shape ionization chamber such that the spherical shape ionization chamber is spaced a distance apart from the shielding layer of the exterior enclosure, with the air space located between the ionization chamber and the shielding layer of the exterior enclosure such that no part of the ionization chamber is part of the exterior enclosure.

4. The radiation detection assembly of claim 2, wherein the exterior enclosure includes a first enclosure portion and a separate second enclosure portion placed together to bound the hollow internal volume with the ionization chamber and the open air space located therein, and the open air space comprises the majority between the ionization chamber and the shielding layer.

5. The radiation detection assembly of claim 2, wherein the shielding layer includes an electrically conductive material and the wall of the exterior enclosure includes at least one of polycarbonate material and plastic material.

6. The radiation detection assembly of claim 5, wherein the shielding layer includes nickel.

7. The radiation detection assembly of claim 2, wherein the wall of the exterior enclosure includes a non-conductive material.

8. The radiation detection assembly of claim 7, wherein the wall of the exterior enclosure is on an exterior of the exterior enclosure.

9. The radiation detection assembly of claim 7, wherein the non-conductive material includes polycarbonate.

10. The radiation detection assembly of claim 7, wherein the non-conductive material is configured to electrically isolate the exterior of the exterior enclosure from the hollow internal volume and the ionization chamber enclosed therein.

11. The radiation detection assembly of claim 7, wherein the shielding layer includes an electrically conductive material located on the interior of the wall of non-conductive material.

12. The radiation detection assembly of claim 11, wherein the electrically conductive material is thinner than the wall of non-conductive material.

13. The radiation detection assembly of claim 12, wherein the electrically conductive material includes nickel.

14. The radiation detection assembly of claim 12, wherein the electrically conductive material has a thickness less than 0.2 centimeters.

15. The radiation detection assembly of claim 1, wherein density of matter between the ionization chamber and the exterior of exterior enclosure is less than 0.7 grams/cm$^2$.

16. The radiation detection assembly of claim 15, wherein a density of the at least one of the layers providing an electromagnetic shield is 0.099 grams/cm$^2$ and a density of another layer of the exterior enclosure is 0.57 grams/cm$^2$.

17. The radiation detection assembly of claim 1, wherein the ionization chamber is spherical shape and the exterior enclosure includes first and second supports that engage and hold the spherical shape ionization chamber such that the spherical shape ionization chamber is located at least a distance apart from the exterior enclosure.

18. The radiation detection assembly of claim 17, wherein the spherical shape ionization chamber is supported at diametrically opposed sides of the spherical shape ionization chamber and is not supported by resilient foam that would surround the spherical shape ionization chamber.

19. The radiation detection assembly of claim 17, wherein a surface of the spherical shape ionization chamber is non-contacted between the first and second supports.

20. The radiation detection assembly of claim 17, wherein the first and second supports are the only means to prevent movement of the spherical shape ionization chamber and contact between the spherical shape ionization chamber and the exterior enclosure.

* * * * *